US010575178B2

(12) United States Patent
Zhang et al.

(10) Patent No.: US 10,575,178 B2
(45) Date of Patent: Feb. 25, 2020

(54) BLUETOOTH DEVICE NETWORKING METHOD AND SYSTEM

(71) Applicant: Xiamen Freefun Technology Co., Ltd, Fujian (CN)

(72) Inventors: Zhiyuan Zhang, Fujian (CN); Xinmiao Zheng, Fujian (CN); Huating Zeng, Fujian (CN)

(73) Assignee: Xiamen Freefun Technology Co., Ltd, Fujian (CN)

( * ) Notice: Subject to any disclaimer, the term of this patent is extended or adjusted under 35 U.S.C. 154(b) by 352 days.

(21) Appl. No.: 15/700,186

(22) Filed: Sep. 11, 2017

(65) Prior Publication Data

US 2018/0317090 A1    Nov. 1, 2018

(30) Foreign Application Priority Data

Apr. 27, 2017   (CN) .......................... 2017 1 0286645

(51) Int. Cl.
*H04W 12/08*      (2009.01)
*H04W 12/06*      (2009.01)
(Continued)

(52) U.S. Cl.
CPC ......... *H04W 12/08* (2013.01); *H04W 12/003* (2019.01); *H04W 12/06* (2013.01);
(Continued)

(58) Field of Classification Search
CPC ..... H04W 12/08; H04W 12/06; H04W 84/18; H04W 4/70; H04W 4/80; H04L 63/0876
See application file for complete search history.

(56) References Cited

U.S. PATENT DOCUMENTS

| 7,522,540 | B1 * | 4/2009 | Maufer ................ H04L 45/18 |
| | | | 370/254 |
| 2017/0105178 | A1 * | 4/2017 | Chirikov .......... H04W 52/0232 |
| 2017/0155750 | A1 * | 6/2017 | Li ...................... H04M 1/7253 |

FOREIGN PATENT DOCUMENTS

| CN | 105578386 | * | 5/2016 |
| CN | 105827282 | * | 8/2016 |

(Continued)

*Primary Examiner* — Ayoub Alata
(74) *Attorney, Agent, or Firm* — JCIPRNET

(57) ABSTRACT

In the disclosure, a Bluetooth device networking method and system comprises the following steps: the terminal initialization preset all Bluetooth devices within the region, and record all Bluetooth devices corresponding to the identification information of the preset range. When the terminal needs to control the Bluetooth device in the preset area, only the control command information is broadcasted. The Bluetooth device receives the control command information equipment, judgment unit of the Bluetooth device will determine whether the identification information control command information contained in equipment for self-identification information corresponding, if executing the equipment control command information, otherwise it will continue to broadcast the control command information. When Bluetooth device executes the control command information, it broadcasts the response information to the outside, and is finally received by the terminal after being transmitted by Bluetooth network. Accordingly, the cost of networking the Bluetooth products of the outdoor can be effectively reduced.

6 Claims, 3 Drawing Sheets

(51) Int. Cl.
*H04W 12/00* (2009.01)
*H04L 29/06* (2006.01)
*H04W 84/18* (2009.01)
*H04W 4/70* (2018.01)
*H04W 4/80* (2018.01)

(52) U.S. Cl.
CPC ........... *H04L 63/0876* (2013.01); *H04W 4/70* (2018.02); *H04W 4/80* (2018.02); *H04W 12/00512* (2019.01); *H04W 84/18* (2013.01)

(56) References Cited

FOREIGN PATENT DOCUMENTS

| | | | |
|---|---|---|---|
| CN | 103136928 | * | 7/2018 |
| CN | 105991164 | * | 6/2019 |

* cited by examiner

BLUETOOTH DEVICE NETWORKING METHOD AND SYSTEM

CROSS-REFERENCE TO RELATED APPLICATION

This application claims the priority benefit of China application serial no. 201710286645.x, filed on Apr. 27, 2017. The entirety of the above-mentioned patent application is hereby incorporated by reference herein and made a part of this specification.

BACKGROUND

1. Technology Field

The present invention relates to the field of Bluetooth networking, in particular, to a Bluetooth networking method and system.

2. Description of Related Art

Existing Bluetooth devices (such as outdoor solar products) are controlled basically by using a hardware switch, that is, powered on to work when a switch is turned on. A small number of high-end outdoor solar products provide a wireless control option, making operations more convenient, and enhancing the user's sensory experience. The forms of wireless control connection include Bluetooth connection, ZigBee connection, 2.4G wireless remote control, WiFi connection, and the like. The use of hardware switch control involves cumbersome operations. Especially for some solar products located high, it is not easy for users to toggle switches.

Bluetooth connection is one of important connection forms using wireless technologies. Bluetooth is a wireless technology standard that implements short-distance data exchange between fixed equipment, mobile devices, and building personal area networks. By means of Bluetooth, multiple devices may be connected, which overcomes the difficulty of data synchronization. Bluetooth is a standard wireless communications protocol based on a low-cost transceiver chip of a device, with a short transmission distance and low power consumption.

At present, due to the limited transmission range of a Bluetooth signal, the use of Bluetooth connection control cannot effectively manage and control multiple devices located in different places. Usually, one terminal device can correspondingly control only one or two Bluetooth products, which undoubtedly hinders the wide popularization of outdoor Bluetooth products. Due to high power consumption, the use of WiFi or 2.4G wireless remote control connection cannot meet a power requirement of outdoor Bluetooth device networking and increases costs. The ZigBee technology can also be used for networking control, but it will cause high use costs and require a conversion device since direct communication connection with a terminal device cannot be implemented.

SUMMARY

Therefore, it is necessary to provide a Bluetooth device networking solution to solve such problems as high costs, operation inconvenience and poor user experience during networking control on Bluetooth devices when the Bluetooth devices are distributed at multiple different locations.

In order to achieve the above objective, the inventors provide a Bluetooth device networking system. The system includes a terminal and a plurality of Bluetooth devices, and each Bluetooth device corresponds to one piece of identification information; the terminal and the Bluetooth devices are each provided with a Bluetooth module; the terminal is connected to a Bluetooth device within a second preset range by means of Bluetooth; the Bluetooth device is connected to another Bluetooth device within a third preset range by means of Bluetooth; the terminal includes an initialization unit, a control command receiving unit and a first communication unit; and the Bluetooth device includes a determining unit, a second communication unit and an execution unit;

the initialization unit is configured to initialize all Bluetooth devices within a first preset range and record identification information corresponding to all the Bluetooth devices within the first preset range;

the control command receiving unit is configured to receive control command information, and the first communication unit is configured to broadcast device control command information within the second preset range, where the device control command information contains identification information corresponding to a Bluetooth device being to execute the control information, and the second preset range is a range that a Bluetooth signal of the terminal can reach;

after the Bluetooth device receives the device control command information, the determining unit of the Bluetooth device is configured to determine whether the identification information contained in the device control command information is identification information corresponding to the Bluetooth device; and if the identification information contained in the device control command information is the identification information corresponding to the Bluetooth device, the execution unit is configured to execute the device control command information; or otherwise, the second communication unit is configured to broadcast the device control command information within the third preset range, where the third preset range is a range that a Bluetooth signal of the Bluetooth device can reach;

after the Bluetooth device executes the device control command information, the second communication unit is further configured to send control response information within the third preset range, where the control response information contains the identification information corresponding to the Bluetooth device; and the first communication unit is configured to receive the control response information and update a control state of the Bluetooth device corresponding to the identification information contained in the control response information to a state after the Bluetooth device executes the device control command information.

Further, the Bluetooth device networking system further includes a server including an authentication unit and a Bluetooth identification information sending unit; and the terminal includes an identity information obtaining unit;

the identity information obtaining unit is configured to obtain identity information of a user; and the authentication unit is configured to authenticate the identity information of the user, send Bluetooth identification information to the terminal after the authentication on the identity information is successful, and correspondingly store the Bluetooth identification information and the identity information of the user in a storage unit of the server.

Further, the terminal includes a login unit and the login unit is configured to receive the Bluetooth identification information, complete login after authentication on the received Bluetooth identification information is successful, and initialize all the Bluetooth devices within the first preset range.

Further, the terminal includes a first terminal and a second terminal, and the first terminal is configured to receive the Bluetooth identification information sent by the server and further configured to send the Bluetooth identification information to the second terminal after receiving an identification information obtaining request of the second terminal.

Further, the control command information contains one or more pieces of addition control information, deletion control information, and state modification control information.

The inventors further provide a Bluetooth device networking method. The method is applied to a Bluetooth device networking system, and the system includes a terminal and a plurality of Bluetooth devices, and each Bluetooth device corresponds to one piece of identification information; the terminal and the Bluetooth devices are each provided with a Bluetooth module; the terminal is connected to a Bluetooth device within a second preset range by means of Bluetooth; the Bluetooth device is connected to another Bluetooth device within a third preset range by means of Bluetooth; the terminal includes an initialization unit, a control command receiving unit and a first communication unit; the Bluetooth device includes a determining unit, a second communication unit and an execution unit; and the method includes the following steps:

the initialization unit initializes all Bluetooth devices within a first preset range and records identification information corresponding to all the Bluetooth devices within the first preset range;

the control command receiving unit receives control command information, and the first communication unit broadcasts device control command information within the second preset range, where the device control command information contains identification information corresponding to a Bluetooth device being to execute the control information, and the second preset range is a range that a Bluetooth signal of the terminal can reach;

after the Bluetooth device receives the device control command information, the determining unit of the Bluetooth device determines whether the identification information contained in the device control command information is identification information corresponding to the Bluetooth device; and if the identification information contained in the device control command information is the identification information corresponding to the Bluetooth device, the execution unit executes the device control command information; or otherwise, the second communication unit broadcasts the device control command information within the third preset range, where the third preset range is a range that a Bluetooth signal of the Bluetooth device can reach;

after the Bluetooth device executes the device control command information, the second communication unit sends control response information within the third preset range, where the control response information contains the identification information corresponding to the Bluetooth device; and the first communication unit receives the control response information and updates a control state of the Bluetooth device corresponding to the identification information contained in the control response information to a state after the Bluetooth device executes the device control command information.

Further, the Bluetooth device networking system further includes a server including an authentication unit and a Bluetooth identification information sending unit; the terminal includes an identity information obtaining unit; and the method further includes the following steps:

the identity information obtaining unit obtains identity information of a user; and the authentication unit authenticates the identity information of the user, sends Bluetooth identification information to the terminal after the authentication on the identity information is successful, and correspondingly stores the Bluetooth identification information and the identity information of the user in a storage unit of the server.

Further, the terminal includes a login unit, and the method further includes the following step:

the login unit receives the Bluetooth identification information, completes login after authentication on the received Bluetooth identification information is successful, and initializes all the Bluetooth devices within the first preset range.

Further, the terminal includes a first terminal and a second terminal, and the method further includes the following step:

the first terminal receives the Bluetooth identification information sent by the server and sends the Bluetooth identification information to the second terminal after receiving an identification information obtaining request of the second terminal.

Further, the control command information contains one or more pieces of addition control information, deletion control information, and state modification control information.

The present invention is characterized as follows: A terminal first initializes all Bluetooth devices within a first preset range and records identification information corresponding to all the Bluetooth devices within the first preset range. When the terminal needs to control a Bluetooth device within the first preset range, the terminal needs to only broadcast control command information. After a Bluetooth device receives the device control command information, a determining unit of the Bluetooth device determines whether identification information contained in the device control command information is identification information corresponding to the Bluetooth device; and if the identification information contained in the device control command information is the identification information corresponding to the Bluetooth device, the device control command information is executed; or otherwise, the control command information is broadcast further. After executing the control command information, a Bluetooth device broadcasts control response information to the outside, and the control response information is transmitted by means of Bluetooth networking and is finally received by the terminal. According to the solutions of the present invention, one terminal controls a number of Bluetooth devices, enhancing the user's sensory experience. Moreover, automated networking can be implemented without routing distribution or path calculation, effectively reducing the networking costs of outdoor Bluetooth products.

DESCRIPTION OF EMBODIMENTS

In order to describe the technical content, construction features and achieved objectives and effects of the technical solutions in detail, the following detailed description is set forth as specific embodiments with reference to the accompanying drawings.

Figure 1:
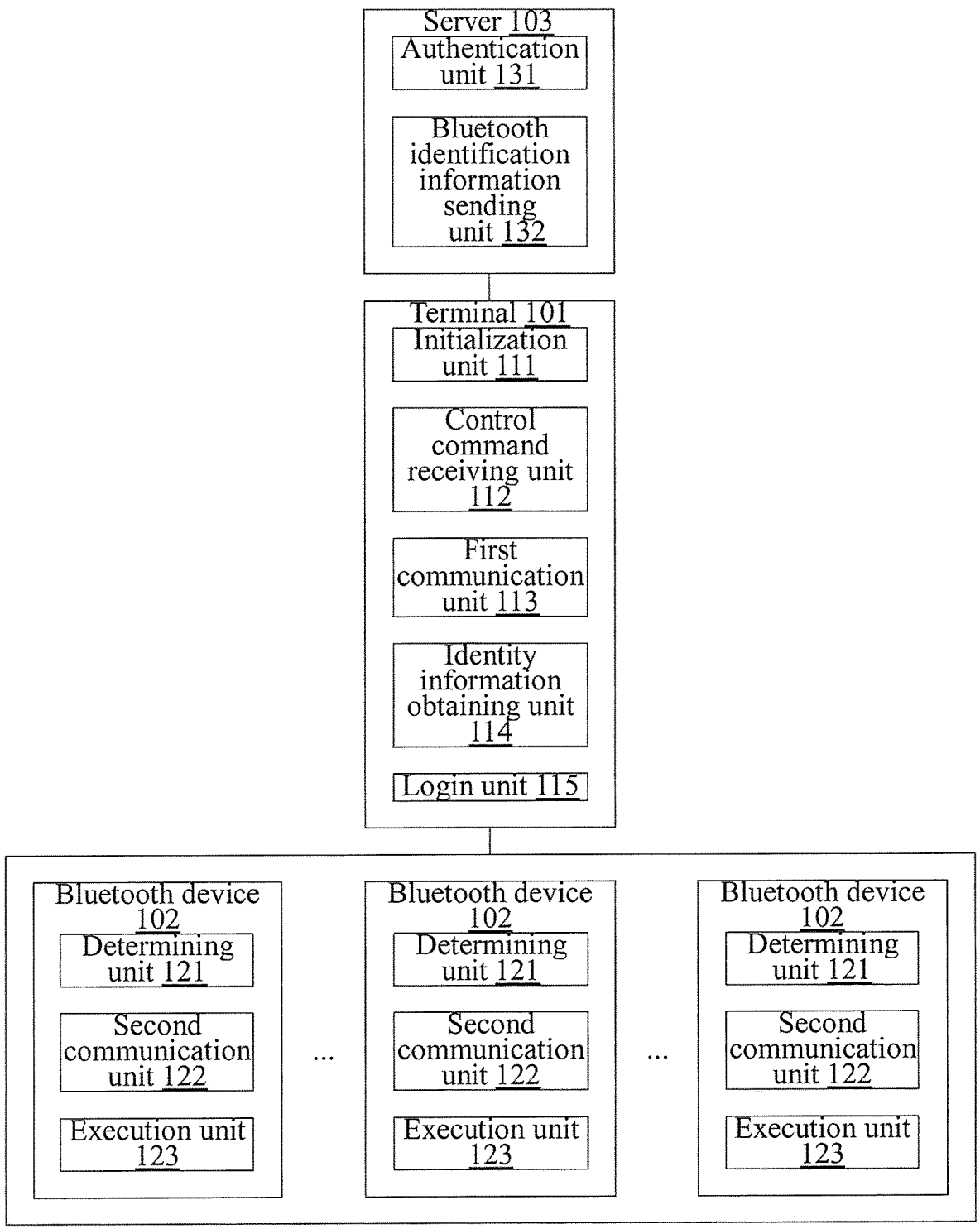
FIG. 1 is a schematic diagram of a Bluetooth device networking system according to an embodiment of the present invention.

Referring to FIG. 1, FIG. 1 is a schematic diagram of a Bluetooth device networking system according to an embodiment of the present invention. The system includes a terminal 101 and a plurality of Bluetooth devices 102. The terminal is an electronic device having a data processing function. Each Bluetooth device 102 corresponds to one piece of identification information. The terminal 101 and the Bluetooth devices 102 are each provided with a Bluetooth module. The terminal 101 may be an intelligent mobile device such as a mobile phone, a tablet computer or a personal digital assistant, or may be an electronic device such as a personal computer or a scanner. The Bluetooth device is an Internet of things device with a built-in Bluetooth module, and may be a smart door lock, a lighting control system, a heating, ventilation and air conditioning (HVAC) system, a household appliance or the like having a Bluetooth function. The identification information is used for distinguishing between the Bluetooth devices, and may be a single numeral or character or may be a character string.

The terminal 101 is connected to a Bluetooth device 102 (may also be referred to as a first Bluetooth device) within a second preset range by means of Bluetooth. The second preset range is a range that a Bluetooth signal of the terminal can reach. The second preset range changes with a location change of the terminal. Usually, a receiving range of a Bluetooth signal is generally approximately 10 meters. Therefore, the second preset range is generally a spherical area formed in a three-dimensional space by taking a current location of the terminal as the center of sphere with a radius of approximately 10 meters. The Bluetooth device 102 is connected to another Bluetooth device within a third preset range by means of Bluetooth. Similarly, the third preset range is a range that a Bluetooth signal of the Bluetooth device can reach, and the third preset range is generally a spherical area formed in the three-dimensional space by taking a current location of the Bluetooth device as the center of sphere with a radius of approximately 10 meters. The third preset range also changes with different installation locations of the Bluetooth device. Certainly, the radius values of the second and third preset ranges may alternatively be other values, depending on strength of the Bluetooth signal of the terminal or Bluetooth device.

The terminal 101 includes an initialization unit 111, a control command receiving unit 112, and a first communication unit 113. The Bluetooth device 102 includes a determining unit 121, a second communication unit 122, and an execution unit 123.

The initialization unit 11 is configured to initialize all Bluetooth devices within a first preset range and record identification information corresponding to all the Bluetooth devices within the first preset range. Bluetooth devices that need to be networked are evenly distributed within the first preset range. The first preset range is an application scenario range covered by Bluetooth networking and may be a park, a school, a community, or the like. After the Bluetooth devices are initialized, the terminal stores the identification information corresponding to all of the Bluetooth devices within the first preset range, to control states of the Bluetooth devices.

The control command receiving unit 112 is configured to receive control command information. The first communication unit 113 is configured to broadcast device control command information within the second preset range. The device control command information contains identification information corresponding to one of the Bluetooth devices that is to execute the control information. In the present embodiment, the control command information contains one or more pieces of addition control information, deletion control information, and state modification control information. The control command information may be triggered by receiving a user's operation information on the terminal. The operation information includes a tap on a screen, a slide track, or the like.

After the Bluetooth device receives the device control command information, the determining unit 121 of the Bluetooth device within the second preset range is configured to determine whether the identification information contained in the device control command information broadcast by the terminal is identification information corresponding to the Bluetooth device. If the identification information contained in the device control command information is the identification information corresponding to the Bluetooth device, the execution unit 123 is configured to execute the device control command information; or otherwise, the second communication unit 122 is configured to broadcast the device control command information within the third preset range.

When the determining unit of the Bluetooth device determines that identification information contained in the device control command information is the identification information corresponding to the Bluetooth device, after the Bluetooth device executes the device control command information, the second communication unit 122 of the Bluetooth device is further configured to send control response information within the third preset range. The control response information contains the identification information corresponding to the Bluetooth device.

The first communication unit 113 is configured to receive the control response information and update a control state of the Bluetooth device corresponding to the identification information contained in the control response information to a state that indicates the Bluetooth device has executed the device control command information.

The use process of the system is described below by using an example in which the control command information is addition control information. After receiving operation information of "adding" a Bluetooth device, the terminal generates corresponding packet information (that is, device control command information) for adding a function of the Bluetooth device, and sends the packet information within the second preset range in the form of broadcasting. There may be one or more Bluetooth devices within the second preset range. After receiving the packet information, each Bluetooth device determines whether identification information (that is, identification information corresponding to the Bluetooth device to be added) contained in the packet information is identification information of the Bluetooth device. If the identification information contained in the packet information is the identification information of the Bluetooth device, the addition control information is executed and control response information corresponding to the control information needs to be sent to the terminal. The control response information is also sent to the terminal layer by layer in the form of broadcasting. When the terminal receives the control response information, it indicates that the Bluetooth device has been added, and a state corresponding to the Bluetooth device on the terminal can be updated from a state "not added" to a state "added". A propagation control manner in a case in which the control command information is deletion control information or state modification control information is not described in detail herein. The deletion control information is information for decontrolling a Bluetooth device from the terminal. The state modification control information is control information for adjusting some current state parameters of a Bluetooth device. For example, if the Bluetooth device is a Bluetooth lamp, the state modification control information may be control information for adjusting the light color, luminous intensity, or the like of the Bluetooth lamp.

Figure 2:
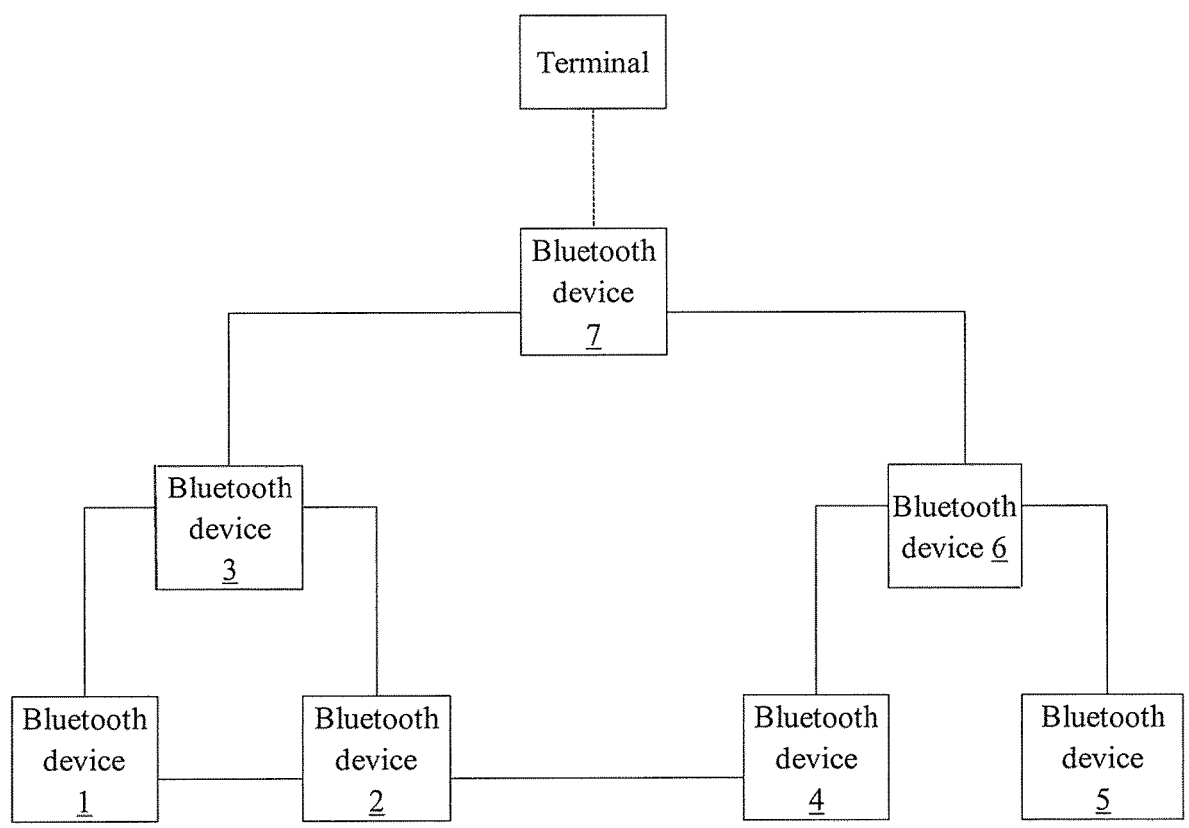
FIG. 2 is a schematic diagram of a Bluetooth device networking system according to another embodiment of the present invention.

Referring to FIG. 2, FIG. 2 is a schematic diagram of a Bluetooth 'device networking system according to another embodiment of the present invention. Seven Bluetooth devices with identification information 1 to 7 are shown in FIG. 2. The Bluetooth device 7 is located within a second preset range corresponding to a terminal, and the remaining Bluetooth devices are located outside the second preset range corresponding to the terminal. The Bluetooth devices 3 and 6 are located within a third preset range of the Bluetooth device 7, and the remaining Bluetooth devices are located outside the third preset range of the Bluetooth device 7. The Bluetooth device 1, the Bluetooth device 2 and the Bluetooth device 3 are located in pair within a third preset range of another Bluetooth device. The Bluetooth device 4, the Bluetooth device 5 and the Bluetooth device 6 are located in pair within a third preset range of another Bluetooth device. Each of the Bluetooth device 2 and the Bluetooth device 4 is located within a third preset range of the other. It is assumed that the terminal needs to control the Bluetooth device 1. Device control command information broadcast by the terminal is first received by the Bluetooth device 7. Since the identification information of the Bluetooth device 7 is not consistent with identification information (that is, the identification information of the Bluetooth device 1) contained in the device control command information, the Bluetooth device 7 broadcasts the device control command information within the third preset range corresponding to the Bluetooth device 7, and the Bluetooth device 3 and the Bluetooth device 6 receive the device control command information. Then, the Bluetooth device 3 and the Bluetooth device 6 further broadcast the device control command information. Since the Bluetooth device 1 is located within the third preset range corresponding to the Bluetooth device 3, the Bluetooth device 1 receives the device control command information. After execution is completed, the Bluetooth device 1 further sends control response information to the terminal. Similarly, the control response information broadcast by the Bluetooth device 1 may be broadcast by the Bluetooth device 3 and the Bluetooth device 7 in sequence and is finally received by the terminal, or may be broadcast by the Bluetooth device 2, the Bluetooth device 4, the Bluetooth device 6 and the Bluetooth device 7 in sequence and is finally received by the terminal. After the terminal receives the control response information, the terminal updates a control state of the Bluetooth device 1 to a state after the Bluetooth device 1 executes the device control command information.

In some embodiments, the system further includes a server 103. The server 103 includes an authentication unit 131 and a Bluetooth identification information sending unit 132. The terminal includes an identity information obtaining unit 114. The identity information obtaining unit 114 is configured to obtain identity information of a user. The authentication unit 131 is configured to authenticate the identity information of the user, send Bluetooth identification information to the terminal after the authentication on the identity information is successful, and correspondingly store the Bluetooth identification information and the identity information of the user in a storage unit of the server.

The user identity information obtaining unit generally includes a user account number and a password. When the server authenticates that the user account number and the password are correct, Bluetooth identification information corresponding to the user identity information is generated in the server and then sent to the terminal. The Bluetooth identification information is in one-to-one correspondence with the user identity information. After the user obtains the Bluetooth identification information, a login operation is performed by using the Bluetooth identification information to obtain permission to initialize and control all Bluetooth devices within a first preset range.

In some embodiments, the terminal includes a login unit 115. The login unit 115 is configured to receive the Bluetooth identification information, complete login after authentication on the received Bluetooth identification information is successful, and initialize all the Bluetooth devices within the first preset range. Since the Bluetooth identification information is specially generated by the server, the login unit may initialize the Bluetooth devices within the first preset range only when the user has successfully logged in by using the Bluetooth identification information, thereby effectively improving security of initialization during Bluetooth networking.

In some embodiments, the terminal includes a first terminal and a second terminal. The first terminal is configured to receive the Bluetooth identification information sent by the server and further configured to send the Bluetooth identification information to the second terminal after receiving an identification information obtaining request of the second terminal. The Bluetooth identification information may be directly transmitted to the second terminal or may be transmitted to the second terminal in the form of a two-dimensional code. In the case of the direct transmission, the second terminal may complete login by inputting the Bluetooth identification information or scanning the two-dimensional code to start the control on the Bluetooth device. In some embodiments, permissions of the first terminal and the second terminal are set differently. For example, if the second terminal completes login by scanning the two-dimensional code sent by the first terminal, the first terminal is a master control device, the second terminal is a slave control device, the first terminal device may perform addition, deletion, state parameter modification and the like on all the Bluetooth devices within the first preset range, and the permission of the second terminal may be limited to modifying state parameters of all the Bluetooth devices within the first preset range, and the second terminal cannot delete an added Bluetooth device or add a Bluetooth device that has not yet been added. Certainly, the first terminal may alternatively send the Bluetooth identification information to a plurality of other terminal devices, so that multiple terminal devices control all the Bluetooth devices within the first preset range, effectively improving the user's interactive experience.

Figure 3:
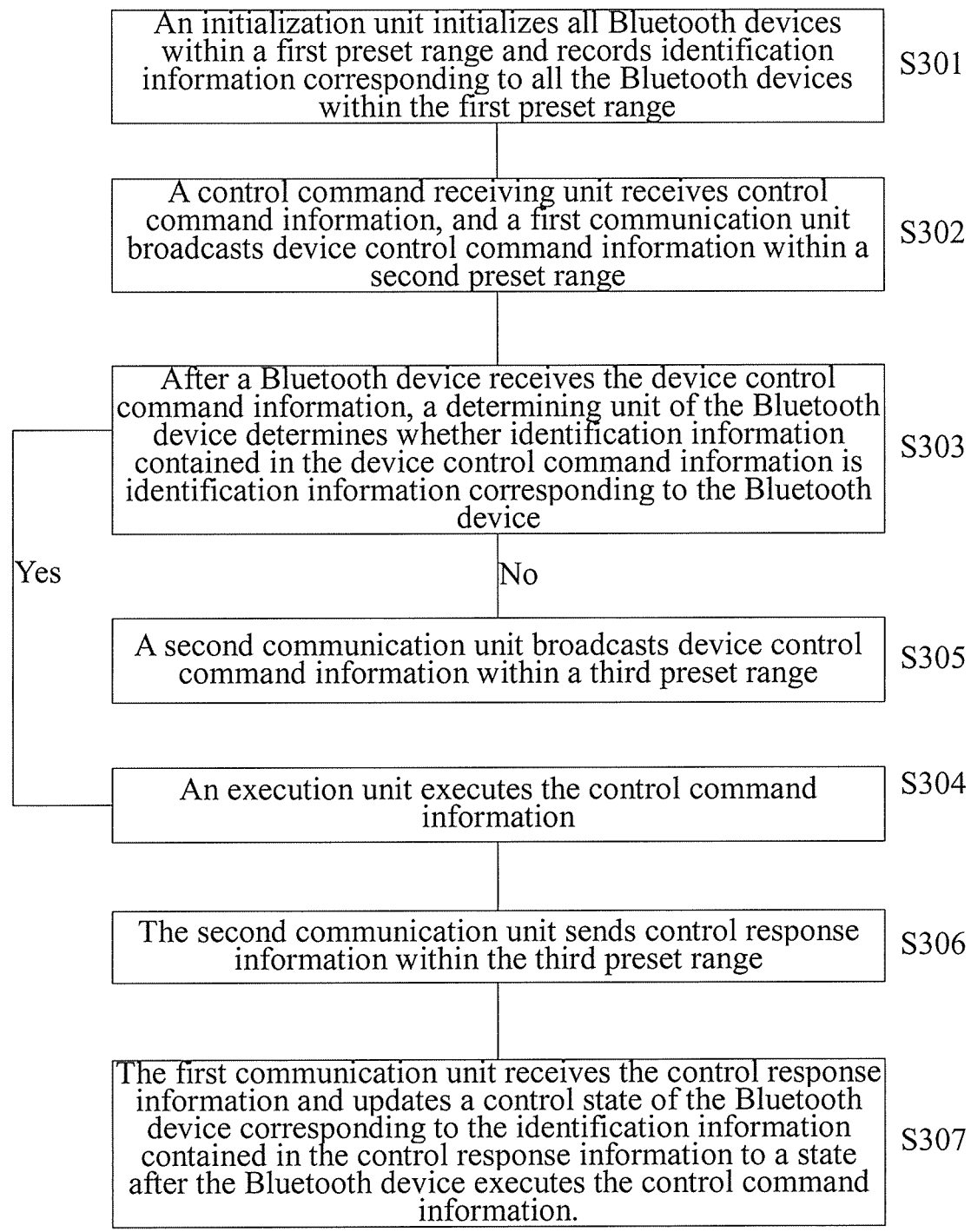
FIG. 3 is a flow chart of a Bluetooth device networking method according to another embodiment of the present invention.

Referring to FIG. 3, FIG. 3 is a flow chart of a Bluetooth device networking method according to another embodiment of the present invention. The method is applied to a Bluetooth device networking system, and the system includes a terminal and a plurality of Bluetooth devices, and each Bluetooth device corresponds to one piece of identification information; the terminal and the Bluetooth devices are each provided with a Bluetooth module; the terminal is connected to a Bluetooth device within a second preset range by means of Bluetooth; the Bluetooth device is connected to another Bluetooth device within a third preset range by means of Bluetooth; the terminal includes an initialization unit, a control command receiving unit and a first communication unit; the Bluetooth device includes a determining unit, a second communication unit and an execution unit; and the method includes the following steps:

First, the procedure goes to step S301: The initialization unit initializes all Bluetooth devices within a first preset range and records identification information corresponding to all the Bluetooth devices within the first preset range.

Then, the procedure goes to step S302: The control command receiving unit receives control command information, and the first communication unit broadcasts device control command information within the second preset range. The device control command information contains identification information corresponding to a Bluetooth device being to execute the control information, and the second preset range is a range that a Bluetooth signal of the terminal can reach.

Then, the procedure goes to step S303: After the Bluetooth device receives the device control command information, the determining unit of the Bluetooth device determines whether the identification information contained in the device control command information is identification information corresponding to the Bluetooth device. If the identification information contained in the device control command information is the identification information corresponding to the Bluetooth device, the procedure goes to step S304: The execution unit executes the device control command information; or otherwise, the procedure goes to step S305: The second communication unit broadcasts the device control command information within the third preset range. The third preset range is a range that a Bluetooth signal of the Bluetooth device can reach.

After the Bluetooth device executes the device control command information, the procedure may further go to step S306: The second communication unit sends control response information within the third preset range. The control response information contains the identification information corresponding to the Bluetooth device.

Then, the procedure further goes to step S307: The first communication unit receives the control response information and updates a control state of the Bluetooth device corresponding to the identification information contained in the control response information to a state after the Bluetooth device executes the device control command information.

In some embodiments, the system further includes a server. The server includes an authentication unit and a Bluetooth identification information sending unit; the terminal includes an identity information obtaining unit; and the method may include the following steps: The identity information obtaining unit obtains identity information of a user. The authentication unit authenticates the identity information of the user, sends Bluetooth identification information to the terminal after the authentication on the identity information is successful, and correspondingly stores the Bluetooth identification information and the identity information of the user in a storage unit of the server. The user identity information obtaining unit generally includes a user account number and a password. When the server authenticates that the user account number and the password are correct, the Bluetooth identification information corresponding to the user identity information is generated in the server and then sent to the terminal. The Bluetooth identification information is in one-to-one correspondence with the user identity information. After the user obtains the Bluetooth identification information, a login operation is performed by using the Bluetooth identification information to obtain permission to initialize and control all the Bluetooth devices within the first preset range.

In some embodiments, the terminal includes a login unit; and the method includes the following step: The login unit receives the Bluetooth identification information, completes login after authentication on the received Bluetooth identification information is successful, and initializes all the Bluetooth devices within the first preset range. Since the Bluetooth identification information is specially generated by the server, the login unit may initialize the Bluetooth devices within the first preset range only when the user has successfully logged in by using the Bluetooth identification information, thereby effectively improving security of initialization during Bluetooth networking.

The present invention is characterized as follows: A terminal first initializes all Bluetooth devices within a first preset range and records identification information corresponding to all the Bluetooth devices within the first preset range. When the terminal needs to control a Bluetooth device within the first preset range, the terminal needs to only broadcast control command information. After a Bluetooth device receives the device control command information, a determining unit of the Bluetooth device determines whether the identification information contained in the device control command information is identification information corresponding to the Bluetooth device; and if the identification information contained in the device control command information is the identification information corresponding to the Bluetooth device, the device control command information is executed; or otherwise, the control command information is broadcast further. After executing the control command information, a Bluetooth device broadcasts control response information to the outside, and the control response information is transmitted by means of Bluetooth networking and is finally received by the terminal. According to the solutions of the present invention, one terminal controls a number of Bluetooth devices, enhancing the user's sensory experience. Moreover, automated networking can be implemented without routing distribution or path calculation, effectively reducing the networking costs of outdoor Bluetooth products.

It should be noted that, relational terms such as "first" and "second" herein are merely used to distinguish an entity or an operation from another entity or operation without necessarily requiring or implying any actual such relationship or order between such entities or operations. Moreover, the term "include", "comprise" and any variants thereof are intended to cover non-exclusive inclusions such that a process, method, article, or terminal device that includes a series of elements not only includes those elements but also includes other elements that are listed explicitly, or also includes inherent elements of this process, method, item, or terminal device. In the absence of more restrictions, the elements defined by the sentence "comprising . . . " or "including . . . " do not preclude other elements existing in the process, method, article or terminal device that includes the elements. In addition, in this context, "greater than", "less than", "exceed" and so on are understood as not including the number itself; "above", "below", "within" and so on are understood as including the number itself.

Although the embodiments have been described above, those skilled in the art are may make additional changes and modifications to these embodiments based on the basic creative concept. Therefore, the foregoing descriptions are merely embodiments of the present invention, and the protection scope of the present invention is not limited thereto.

All equivalent structure or process changes made according to the content of this specification and accompanying drawings in the present invention or by directly or indirectly applying the present invention in other related technical fields shall fall within the protection scope of the present invention.

What is claimed is:

1. A Bluetooth device networking system, comprising a terminal and a plurality of Bluetooth devices,
    wherein each Bluetooth device corresponds to one piece of identification information, the terminal and the Bluetooth devices are each provided with a Bluetooth module,
    wherein the terminal is connected to a first Bluetooth device among the plurality of the Bluetooth devices within a second preset range via a first Bluetooth connection, the first Bluetooth device is connected to another Bluetooth device within a third preset range via a second Bluetooth connection,
    wherein the terminal comprises an initialization unit software, a control command receiving unit software and a first communication unit software,
    wherein the first Bluetooth device comprises a determining unit software, a second communication unit software and an execution unit software,
    wherein the initialization unit software is configured to initialize the plurality of Bluetooth devices within a first preset range and record a plurality of identification information corresponding to the plurality of Bluetooth devices within the first preset range,
    wherein the control command receiving unit software is configured to receive control command information, and the first communication unit software is configured to broadcast device control command information within the second preset range, wherein the device control command information contains identification information corresponding to at least one of the plurality of Bluetooth devices that is to execute the device control command information, wherein the second preset range is a range that a Bluetooth signal of the terminal reaches, wherein the second preset range is operating within the first preset range;
    after the first Bluetooth device among the Bluetooth devices receives the device control command information, the determining unit software of the first Bluetooth device is configured to determine whether the identification information contained in the device control command information is identification information corresponding to the first Bluetooth device, and if the identification information contained in the device control command information is the identification information corresponding to the first Bluetooth device, the execution unit software is configured to execute the device control command information; otherwise if the identification information contained in the device control command information is not the identification information corresponding to the first Bluetooth device, the second communication unit software is configured to broadcast the device control command information within the third preset range, wherein the third preset range is a range that a Bluetooth signal of the first Bluetooth device reaches, wherein the third preset range is operating within the first preset range,
    in response to a determination that the identification information contained in the device control command information is the identification information corresponding to the first Bluetooth device, and after the first Bluetooth device executes the device control command information, the second communication unit software is further configured to send control response information within the third preset range, wherein the control response information contains the identification information corresponding to the first Bluetooth device,
    wherein the first communication unit software is configured to receive the control response information and update a control state of the first Bluetooth device corresponding to the identification information contained in the control response information to a state indicating the Bluetooth device has executed the device control command information;
    wherein the system further comprises a server, wherein the server comprising an authentication unit software and a Bluetooth identification information sending unit software, and wherein the terminal comprises an identity information obtaining unit software, wherein the identity information obtaining unit software is configured to obtain identity information of a user, and the authentication unit software is configured to authenticate the identity information of the user, generate and send the Bluetooth identification information to the terminal after the authentication on the identity information is successful, and correspondingly store the Bluetooth identification information and the identity information of the user in a storage unit of the server; and
    wherein the terminal comprises a login unit software, and wherein the login unit software is configured to receive the Bluetooth identification information from the server, complete login after authentication on the received Bluetooth identification information is successful, and perform the initializing of the plurality of the Bluetooth devices within the first preset range.

2. The Bluetooth device networking system of claim 1, wherein the terminal comprises a first terminal hardware and a second terminal hardware, wherein the first terminal hardware is configured to receive the Bluetooth identification information sent by the server and wherein the first terminal hardware is further configured to send the Bluetooth identification information to the second terminal after receiving an identification information obtaining request of the second hardware terminal.

3. The Bluetooth device networking system of claim 1, wherein the device control command information comprises one or more of addition control information, deletion control information, and state modification control information.

4. A Bluetooth device networking method, applied to a Bluetooth device networking system, wherein the method comprises the following steps:
    initializing by a terminal a plurality of Bluetooth devices within a first preset range and records identification information corresponding to the plurality of the Bluetooth devices within the first preset range;
    broadcasting by the terminal a device control command information within the second preset range, wherein the device control command information contains identification information corresponding to at least one of the plurality of Bluetooth devices that is to execute the device control command information, wherein the second preset range is a range that a Bluetooth signal of the terminal reaches within the first preset range,
    in response to receiving by the first Bluetooth device, the device control command information, determining by the first Bluetooth device whether the identification information contained in the device control command information is identification information corresponding to the first Bluetooth device, and if the identification information contained in the device control command information is the identification information corresponding to the first Bluetooth device, executing by the first Bluetooth device the device control command information;

otherwise if the identification information contained in the device control command information is not corresponding to the first Bluetooth device, broadcasting by the first Bluetooth device, the device control command information within a third preset range, wherein the third preset range is a range that a Bluetooth signal of the Bluetooth device can reach within the first preset range;

in response to determining that the identification information contained in the device control command information is the identification information corresponding to the first Bluetooth device, and after the first Bluetooth device executes the device control command information, sending by first Bluetooth device a control response information within the third preset range, wherein the control response information contains the identification information corresponding to the first Bluetooth device; and receiving by the terminal the control response information and updating by the terminal a control state of the first Bluetooth device corresponding to the identification information contained in the control response information to a state indicating that the first Bluetooth device has executed the device control command information;

wherein the initializing step performed by the terminal comprises:

obtaining by a server an identity information of a user; and authenticating by the server the identity information of the user, generating and sending Bluetooth identification information to the terminal after the authentication on the identity information is successful, and correspondingly storing the Bluetooth identification information and the identity information of the user in a storage unit of the server; and receiving by the terminal the Bluetooth identification information from the server, completing login after authentication on the received Bluetooth identification information is successful, and initializing the plurality of Bluetooth devices within the first preset range.

5. The Bluetooth device networking method of claim 4, wherein the terminal comprises a first terminal and a second terminal, and wherein the method comprises following steps: receiving by the first terminal the Bluetooth identification information sent by the server and sending by the first terminal the Bluetooth identification information to the second terminal after receiving an identification information obtaining request of the second terminal.

6. The Bluetooth device networking method of claim 4, wherein the device control command information comprises one or more of addition control information, deletion control information, and state modification control information.

* * * * *